United States Patent [19]

Tandy, Jr. et al.

[11] Patent Number: 5,651,561

[45] Date of Patent: Jul. 29, 1997

[54] TWIN I-BEAM FRONT SUSPENSION SYSTEM

[75] Inventors: Donald Frank Tandy, Jr., Novi; Chunping John Meng, Rochester Hills, both of Mich.

[73] Assignee: Ford Motor Company, Dearborn, Mich.

[21] Appl. No.: 399,315

[22] Filed: Mar. 6, 1995

[51] Int. Cl.[6] ............................................. B62D 17/00
[52] U.S. Cl. ..................................... 280/661; 280/691
[58] Field of Search .................................. 280/661, 846, 280/93, 95.1, 660, 688, 691, 690, 673

[56] References Cited

U.S. PATENT DOCUMENTS

| | | |
|---|---|---|
| 1,804,713 | 5/1931 | Stockton . |
| 1,940,795 | 12/1933 | Gerardi . |
| 1,944,441 | 1/1934 | MacPherson . |
| 2,152,660 | 4/1939 | Paton ................................ 280/95.1 |
| 2,153,083 | 4/1939 | Griswold ........................... 280/661 |
| 2,153,271 | 4/1939 | Paton ................................ 280/661 |
| 2,840,385 | 6/1958 | Heftler .............................. 280/93 |
| 2,841,412 | 7/1958 | Mineck .............................. 280/846 |
| 3,064,750 | 11/1962 | Buchwald . |
| 3,241,854 | 3/1966 | Hamilton . |
| 3,256,028 | 6/1966 | Fehlberg ............................ 280/661 |
| 4,271,922 | 6/1981 | Kishline . |
| 4,533,157 | 8/1985 | Hoenle et al. . |
| 4,614,359 | 9/1986 | Lundin et al. ....................... 280/661 |
| 4,650,208 | 3/1987 | Mason ............................... 280/661 |
| 4,687,224 | 8/1987 | Selzer . |
| 4,754,991 | 7/1988 | Jordan .............................. 280/661 |
| 4,804,205 | 2/1989 | Parsons . |
| 4,869,527 | 9/1989 | Coddens ............................ 280/663 |
| 4,953,278 | 9/1990 | Specktor et al. ..................... 29/402.06 |
| 5,401,049 | 3/1995 | Richardson ......................... 280/663 |

FOREIGN PATENT DOCUMENTS 125297  11/1931  Germany .

OTHER PUBLICATIONS

Photograph showing Ford Aerostar lower control arm with silent block bushings (Photo p. 1).
Photograph showing upper arm adjustment on 1990's Crown Victoria short/long-arm suspension system (Photo p. 2).
Photograph showing suspension system in a Ford off-road racing truck (Photo p. 3).

*Primary Examiner*—Paul N. Dickson
*Attorney, Agent, or Firm*—Gregory P. Brown; Roger L. May

[57] ABSTRACT

A novel twin I-beam front suspension system is disclosed having a first and a second radius arm, the rearward end of each radius arm being adapted to cooperate with a bushing to connect to the vehicle frame. The radius arm bushing static rate on one side of the suspension differs from the radius arm bushing static rate on the other side of the suspension so as to balance the radius arm longitudinal deflections on the two sides of the vehicle. In the preferred embodiment, a silent block bushing replaces the traditional radius arm bushing to reduce pan complexity and to provide increased radius arm bushing life. Radius arm systems are also disclosed which permit quick, easy and accurate adjustment of the front wheel caster angle. A parallelogram steering linkage decouples the two front wheels from one another to provide a toe curve for each front tire that is independent of the vertical displacement of the other front tire.

18 Claims, 6 Drawing Sheets

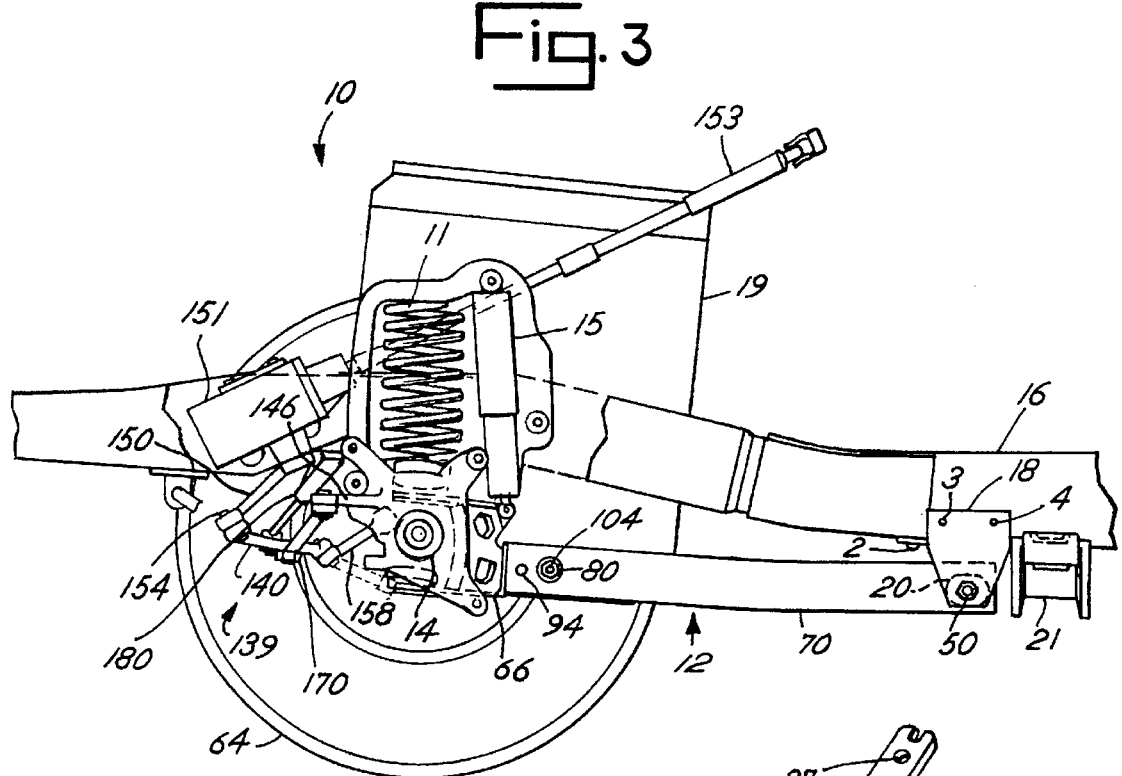
Fig. 3
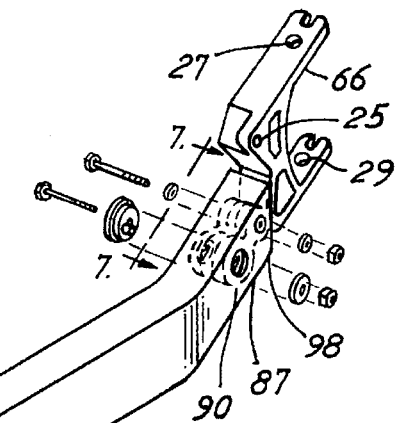
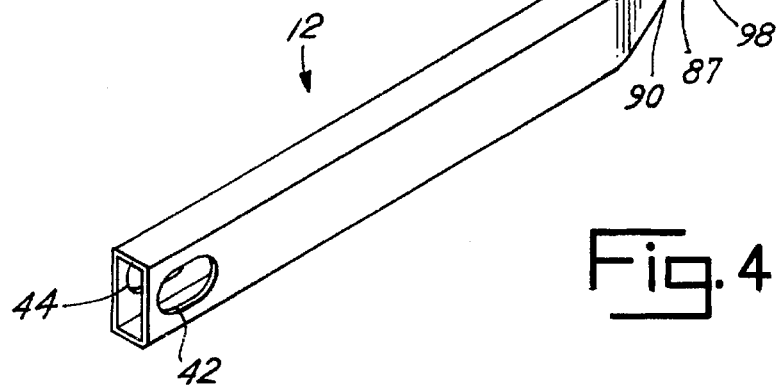
Fig. 4

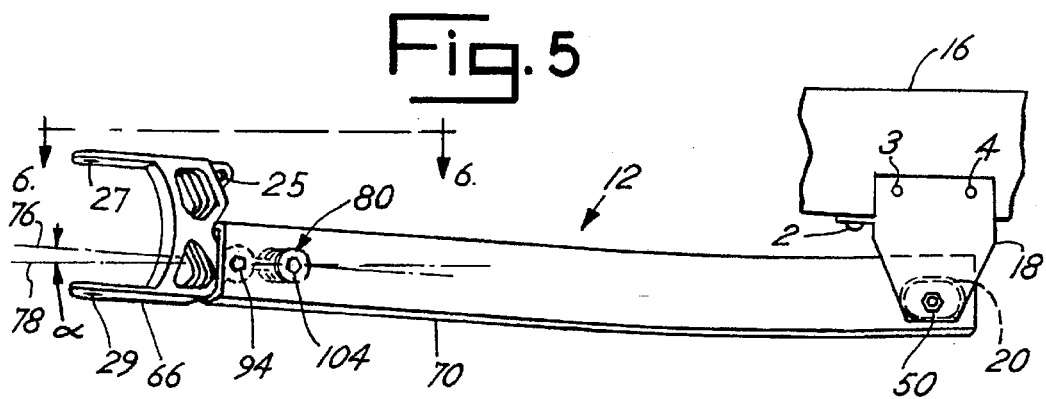
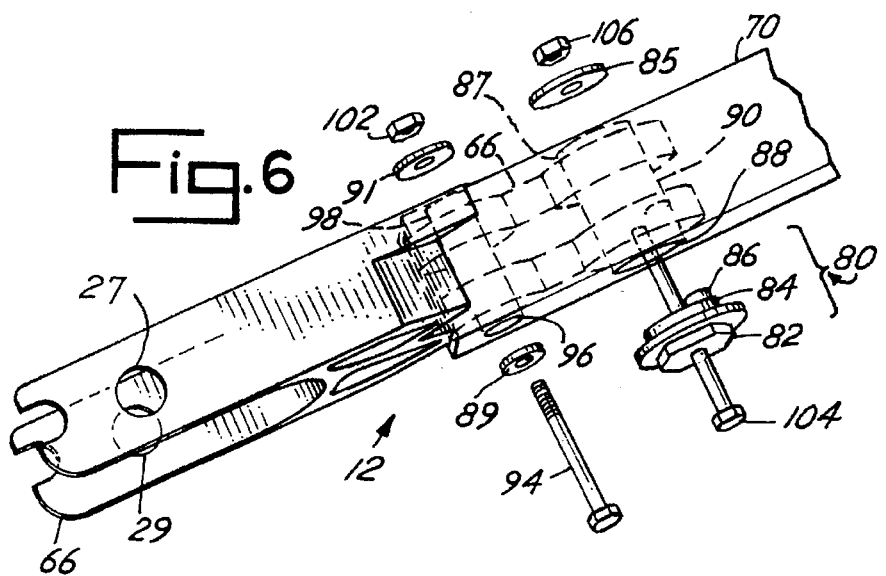
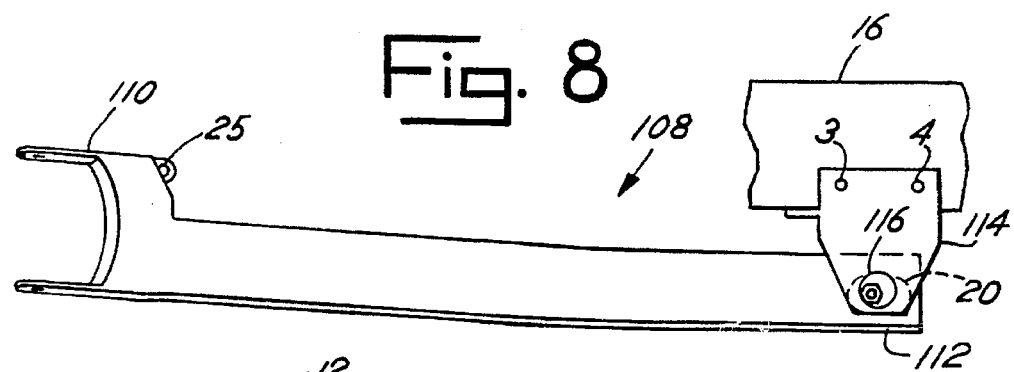
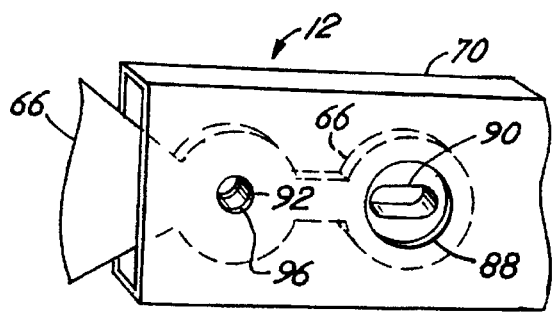

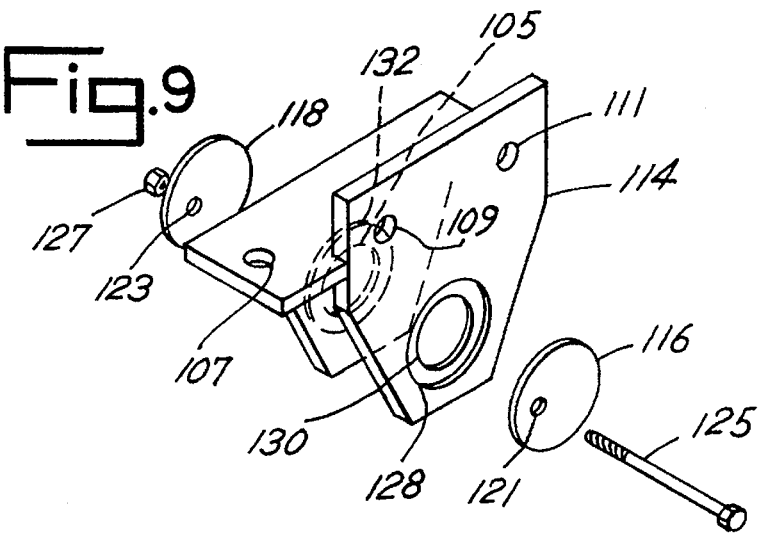
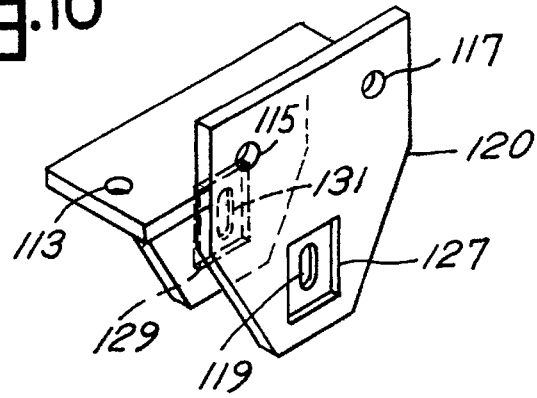
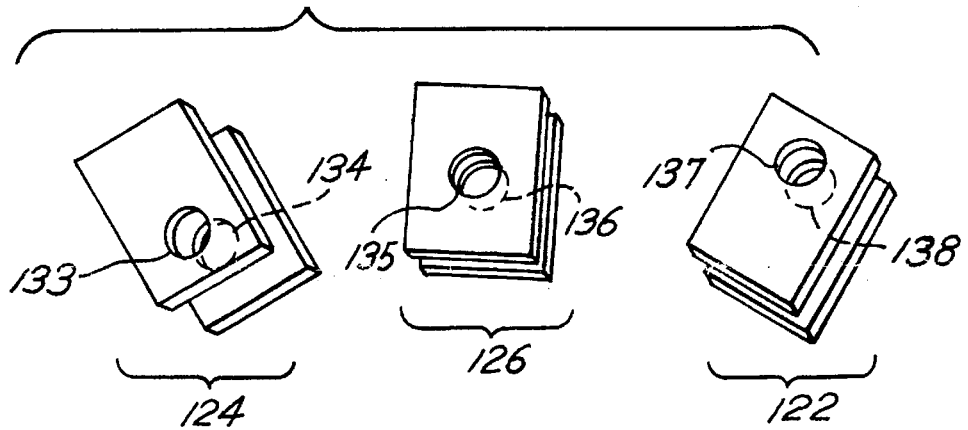

TWIN I-BEAM FRONT SUSPENSION SYSTEM

BACKGROUND OF THE INVENTION

The present invention relates to vehicle suspension systems and, more particularly, to twin I-beam front suspension systems.

Twin I-beam front suspension designs are known generally in the art. These systems have been difficult at times to tune or develop for solid steering feel and precise handling. The twin I-beam front suspension system of the present invention is directed at improving the known prior art systems in a variety of respects.

In the traditional Haltenberger steering design used on other twin I-beam suspension systems, for example, the toe change with vertical wheel travel of the left front wheel is dependent upon the particular instantaneous vertical displacement of the right front wheel. This dependency between the left and right sides of the twin I-beam suspension tends to contribute to vehicle drift and tire wear, and can impose loads on the steering gear assembly.

In addition, the radius arms of traditional twin I-beam suspension systems attach to the vehicle frame in relatively complex manner, requiting the on-line assembly of a number of components to complete the connection. Furthermore, standard or traditional radius arm bushings can wear rapidly and can also produce unwanted stress noises. Moreover, traditional twin I-beam suspension designs do not adequately balance the toe angle changes between the two front tires due to longitudinal forces. This can contribute to vehicle drift, especially during braking.

It is also difficult to easily, quickly and accurately set the front wheel caster angle in traditional twin I-beam suspension systems. To adjust the caster angle on a typical twin I-beam front suspension system, a mechanic must remove the front coil spring assembly and replace a metal slug which fits around the upper ball joint. Not only is this a difficult and time consuming process, but it is also problematic in that the various sizes of slugs available limit the resolution with which the caster angle may be adjusted. Precise caster angle adjustment is thereby extremely difficult, if not impossible, in traditional twin I-beam front suspension systems.

It therefore is an object of the present invention to provide a tuned and more durable vehicle front suspension system that provides a variety of advantages, including steering and vehicle handling improvements, as well as a reduction in part complexity, steering gear loads and average tire wear.

SUMMARY OF THE INVENTION

These and other important objects are met by the twin I-beam front suspension system of the present invention. Disclosed is a front suspension system having a first radius arm and a second radius arm, each radius arm having a forward end and a rearward end. The forward ends of the first and second radius arms are adapted to be connected to a first front axle and a second front axle, respectively. The second front axle is disposed rearward of the first front axle.

First and second radius arm bushings are adapted to lie intermediate the rearward ends of the first and second radius arms, respectively, and the frame of the vehicle when the radius arms are connected to the vehicle frame. The first bushing has a different stiffness or static rate than the second bushing. The static rate associated with the second bushing is greater than the static rate associated with the first bushing. This difference in bushing static rates accounts for the longitudinally-staggered position of the two front axles, and thereby balances the toe angle changes between the two front rites, especially during braking. The two bushings can be of differing size so as to avoid confusion between the two bushings during suspension system assembly.

The first and second radius arm bushings are preferably silent block bushing assemblies. The use of a silent block bushing to connect a radius arm to a vehicle frame reduces part complexity and, in turn, reduces assembly time. Moreover, the silent block radius arm bushing also has a longer average lifespan than more traditional radius arm bushings. The silent block design is also less likely to squeak during suspension movement.

A radius arm system is also disclosed which permits quick, easy and accurate adjustment of the front wheel caster angle. A first radius arm portion is adapted to be connected to a vehicle frame, while a second radius arm portion is adapted to be connected to a front axle. An adjustment means permits adjustment of a pivot angle between an axis of the first radius arm portion and an axis of the second radius arm portion. Once the desired pivot angle has been obtained through the adjustment means, the connection means is used to fix and secure the second portion to the first portion whereby the select pivot angle is maintained between the first and second radius arm portions.

An alternative radius arm system includes an adjustment means that permits adjustment of the vertical position of the rearward end of the radius arm relative to the vehicle frame. Adjusting the vertical position of the rearward end of the radius arm in turn adjusts the front wheel caster angle. Once the desired vertical position has been obtained, the connection means fixes and secures the rearward end of the radius arm to the vehicle frame, whereby the select vertical position is maintained and the front wheel caster angle is set.

Also disclosed is a parallelogram steering linkage which improves vehicle steering and handling. The linkage includes a center link having a first end adjacent a first steering knuckle and a second end adjacent a second steering knuckle. A first tie rod has a first end connected to the first end of the center link, and a second end connected to the second steering knuckle. A second tie rod has a first end connected to the center link intermediate the first and second ends of the center link. A second end of the second tie rod is connected to the first steering knuckle. This steering linkage decouples the left and right front wheels which, in turn, separates the toe change of each front tire to reduce tire wear, steering gear loads, and vehicle drift and wander in straight-line driving.

BRIEF DESCRIPTION OF THE DRAWING

A preferred embodiment of the present invention is described herein with reference to the drawing wherein:

FIG. 3 is a side elevational view of the front suspension system illustrated in FIGS. 1 and 2;

FIG. 4 is a reverse side perspective view of the left radius arm portion of the front suspension system illustrated in FIGS. 1–3, with an exploded view of an eccentric cam assembly and bolt and nut configurations;

FIG. 5 is a side view of the left radius arm and cooperating left vehicle frame bracket shown in FIG. 3;

FIG. 6 is a top view of a front section of the left radius arm illustrated in FIG. 5;

FIG. 7 is a side view of a section of the left radius arm illustrated in FIG. 4;

FIG. 8 is a side view of an alternative embodiment of the left radius arm and vehicle frame bracket assembly;

FIG. 9 is a perspective, exploded view of the vehicle frame bracket illustrated in FIG. 8;

FIG. 10 is a perspective view of yet another alternative embodiment of the vehicle frame bracket;

FIG. 11 illustrates three different example sets of vehicle frame bracket plates for use in connection with the vehicle frame bracket shown in FIG. 10;

DESCRIPTION OF THE PREFERRED EMBODIMENT

Figure 1:
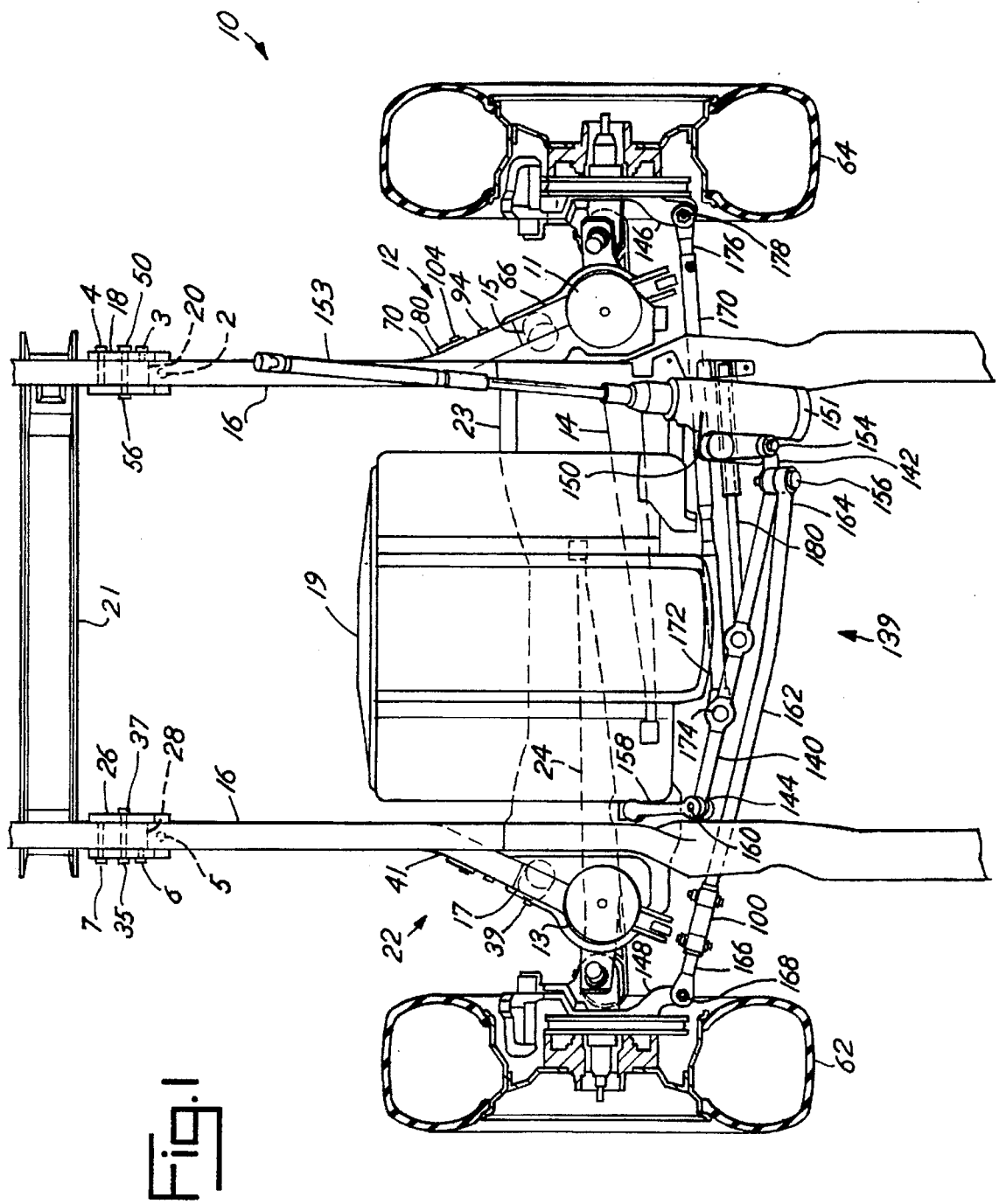
FIG. 1 is a top view of a twin I-beam from suspension system for a vehicle incorporating the salient features of the present invention.

Referring first to FIGS. 1–4, there is shown a twin I-beam front suspension system 10 for a vehicle and, more particularly, a truck. Opposing sides of a vehicle frame 16 are joined together by frame cross members 21 and 23. An engine 19 is disposed over the frame cross member 23. Coil springs 11 and 13 and front shock absorbers 15 and 17 are positioned on their respective sides of the vehicle frame 16. Two front axles 14 and 24 are situated beneath the vehicle frame 16. The front axle 24 is disposed rearward of the front axle 14.

As is best shown in FIG. 3, a radius arm 12 on the left side of the vehicle frame 16 has a forward end and a rearward end. The forward end is adapted to be connected in a conventional manner to the front axle 14. The rearward end is connected to the vehicle frame 16 through the assembly comprising the vehicle frame bracket 18 and the radius arm bushing 20.

A radius arm 22 on the right side of the vehicle also has a forward end and a rearward end, like the radius arm 12. The forward and rearward ends of the radius arm 22 are adapted to be connected to the front axle 24 and the vehicle frame 16, respectively, in a similar manner as the radius arm 12 connects to the front axle 14 and vehicle frame 16. In particular, the radius arm 22 connects to the vehicle frame 16 through the vehicle frame bracket 26 and the radius arm bushing 28. Vehicle frame brackets 18 and 26 are secured onto the vehicle frame 16 by bolts 2 and 5 and rivets 3, 4, 6 and 7.

Figure 12:
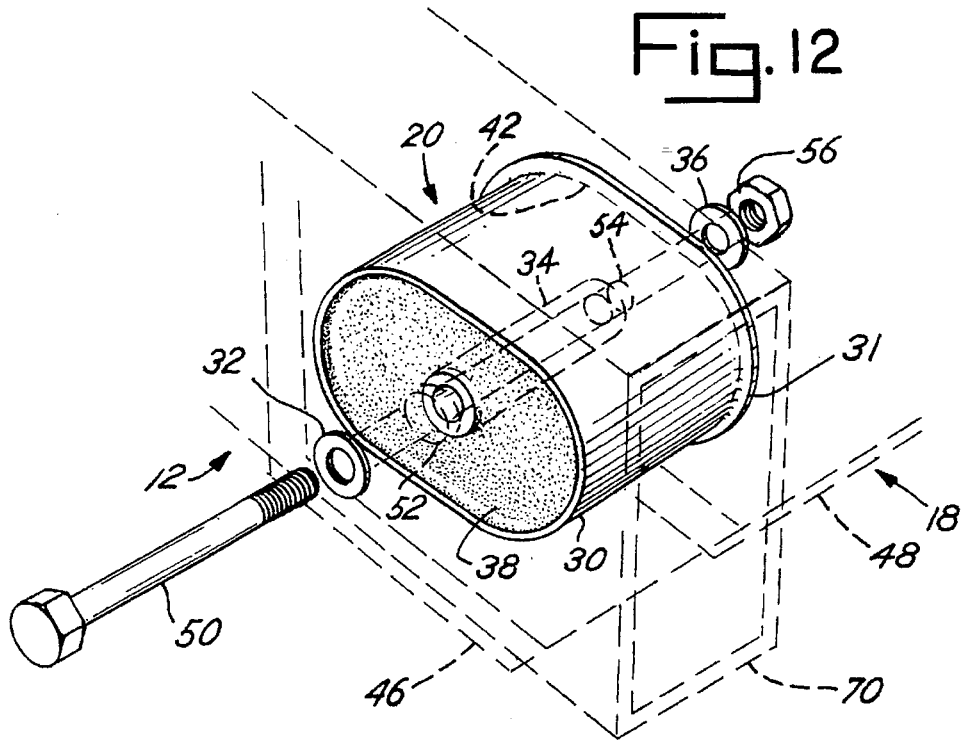
FIG. 12 is a side perspective view of the preferred silent block radius arm bushing of the present invention, illustrated in position with a radius arm and vehicle frame bracket shown in phantom, and with an exploded view of a radius arm bolt, nut and washer assembly.

The bushings 20 and 28 are preferably silent block type bushings. Bushing 20, for example, is best illustrated in FIG. 12. Bushing 20 is a unit having an outer can 30, a retaining bolt inner sleeve 34, and rubber 38 of a desired stiffness intermediate the inner sleeve 34 and outer can 30. The outer can 30 preferably has a flange 31 at one end. The design and construction of bushing 28 is preferably of similar to bushing 20, and therefore includes an outer can with a flange at one end, a retaining bolt inner sleeve, and rubber intermediate the outer can and inner sleeve.

The silent block bushings 20 and 28 are preferably designed to be wide in the radial dimension and to have a relatively short axial length so that the bushings are capable of withstanding the large conical loadings radius arms can impose on radius arm bushings. It is desirable to keep any high twist torques imposed by the radius arms on the vehicle frame brackets 18 and 26 to a minimum. The axial length of the bushings 20 and 28 should not be too short, however, or else the bushing will not have the desired durability.

Bushings 20 and 28, and more particularly the outer cans of the bushings, are preferably elliptical or otherwise oblong in shape, while the inner sleeves of bushings 20 and 28 are circular in a cross-sectional view. This configuration operates to keep the front suspension system stiff in the vertical direction while softening the front suspension system in the longitudinal direction through the additional bushing rubber in the longitudinal dimension of the bushings 20 and 28. The softening of the suspension system in the longitudinal direction in turn improves suspension noise, vibration and harshness levels.

Referring now to FIGS. 4 and 12, the silent block bushing 20, for example, is adapted to be received as a unit inside the rearward end of radius arm 12 through apertures 42 and 44. When the bushing 20 is in place in the radius arm 12, the flange 31 of bushing 20 rests outside of aperture 42 and prevents the bushing 20 from passing completely through aperture 42. The radius arm 12 is then connected to the vehicle frame 16 by placing the rearward end of the radius arm 12, with the bushing 20 therein, between two opposing sides 46 and 48 of the vehicle frame bracket 18, and by passing a retaining bolt 50 commonly through the apertures 52 and 54 in the vehicle frame bracket 18, the inner sleeve 34 of the bushing 20, and washers 32 and 36. A nut 56 holds the retaining bolt 50 in position.

Figure 13:
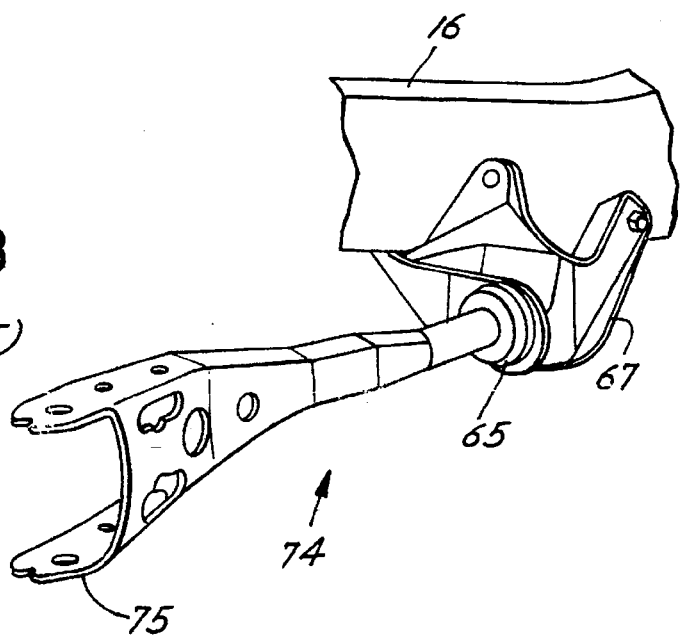
FIG. 13 is a perspective view of a traditional radius arm, radius arm bushing, and vehicle frame bracket assembly.

Standard radius arm bushings, like the bushing 65 shown as a part of the traditional radius arm assembly 74 of FIG. 13, are intermediate the radius arm 75 and the vehicle frame 16 to help provide a non-rigid connection between the radius arm 75 and the vehicle frame 16. The silent block bushing 20 is similarly intermediate the radius arm 12 and the vehicle frame 16 when the radius arm 12 is connected to the vehicle frame 16 through bracket 18, as described above, so as to help form a non-rigid connection between the radius arm 12 and the vehicle frame 16.

Since the silent block bushing 20 is intermediate the radius arm 12 and the vehicle frame 16 when the radius arm 12 is connected to the vehicle frame 16 through bracket 18, like the bushing 65 of the traditional radius arm assembly 74 shown in FIG. 13 is intermediate the radius arm 75 and the vehicle frame 16, the silent block bushing helps form a non-rigid connection between the radius arm 12 and the vehicle frame 16.

Bushing 28 is similarly positioned within like apertures at the rearward end of the radius arm 22. Radius arm 22 connects to the vehicle frame 16 through bracket 26 in a manner similar to the connection of the radius arm 12 and the bracket 18 described above. Accordingly, a retaining bolt 35 passes commonly through washers, apertures in the vehicle frame bracket 26, and the inner sleeve of the bushing 28. A nut 37 holds the retaining bolt 35 in position. The silent block bushing 28 is thereby intermediate the radius arm 22 and the vehicle frame 16 when the radius arm 22 is connected to the vehicle frame 16 through bracket 26.

Use of the silent block bushings 20 and 28 to connect the radius arms 12 and 22 to the vehicle frame 16 reduces assembly time and complexity, as the silent block bushings 20 and 28 can easily be pressed into position in the respective radius arms 12 and 22 in advance of the time and point in vehicle assembly where the radius arms 12 and 22 are attached to the vehicle frame 16. The silent block bushings 20 and 28 also tend to last longer than traditional radius arm bushings, and are less likely over time to create disturbing stress-related noises.

In the preferred embodiment, the static rate of the bushing 28 is greater than the static rate of the bushing 20. In other twin I-beam front suspension systems, the longitudinally-spaced nature of the two front axles causes the radius arm that is connected to the rearward front axle to experience greater lateral deflections than the other radius arm when similar longitudinal forces are applied to the two front tires, such as during braking. In the embodiment of the present invention shown in the figures, however, the static rate of the bushing 28 is selected to be sufficiently greater than the static rate of the bushing 20 so as to equalize the lateral deflection rates of the radius arms 12 and 22. This in turn helps balance the toe angle changes of the right front tire 62 with the toe angle changes of the left front tire 64, especially during braking. This can help reduce tire wear and vehicle drift.

The bushing 28 is preferably shaped similarly to the bushing 20 and, accordingly, the bushing 28 has dimensions which correspond with respective dimensions on the bushing 20, and visa versa. In the preferred embodiment of the invention, however, at least one dimension of the bushing 28, such as the radial width dimension, for example, has a different size than the corresponding dimension of the bushing 20. This difference between the values of corresponding bushing dimensions helps distinguish the two bushings 20 and 28 from one another, which can be especially important during vehicle assembly when the static rates of the two bushings 20 and 28 differ from one another, as described above, and must be installed on the appropriate side of the vehicle suspension system. Specifically tailoring the sizes of the apertures in the rearward ends of the radius arms 12 and 22 to match the unique sizes of the respective radius arm bushings 20 and 28 can help ensure placement of the bushings in the appropriate radius arms.

The radius arms 12 and 22 shown in FIGS. 1–7 are virtually identical, except that the radius arm 12 is configured for the left side of the vehicle frame 16 while radius arm 22 is configured for the right side of the vehicle frame 16. Radius arms 12 and 22 shown in FIGS. 1–7 are therefore each of a similar two-piece design.

Referring now to FIGS. 4–7, for example, a forward portion 66 of radius arm 12 is adapted to be connected to the front axle 14 in a conventional manner using a torque bolt and nut assembly in combination with radius arm apertures 27 and 29. Shock absorber 15 connects in a conventional manner to the radius arm at aperture 25. A forward portion 39 of radius arm 22 is similarly configured to connect to front axle 24 and shock absorber 17.

An adjustment means associated with each radius arm 12 and 22 permits quick, easy and accurate adjustment of the caster angles of the front wheels. More specifically, the adjustment means permits the pivot angle between the two portions of the radius arm to be adjusted or, in other words, increased or decreased. Referring now to FIG. 5, for example, the pivot angle is perhaps best described as the angle α between the axis 76 of the forward portion 66 of radius arm 12 and the axis 78 of the rearward portion 70 of radius arm 12. A change in the pivot angle α in turn changes the front wheel caster angle.

In this embodiment of the present invention, the adjustment means for each radius arm 12 and 22 preferably includes an eccentric cam assembly operatively associated with the forward and rearward portions of each radius arm.

Referring specifically now to FIGS. 6 and 7, for example, the preferred eccentric cam assembly 80 includes a hex portion 82, a circular spacer portion 84, and an offset eccentric cam portion 86. The circular spacer portion 84 fits in the circular aperture 88 on the outboard side of the rearward portion 70. The eccentric cam portion 86 fits into and rides within the elliptical slot 90 in the forward portion 66. To adjust the caster angle, the hex portion 82 is rotated which, in turn, moves the eccentric cam portion 86 within the elliptical slot 90 in forward portion 66. Such movement of the eccentric cam portion 86 causes the forward portion 66 to pivot about its forward aperture 92 relative to the rearward portion 70 when a forward bolt 94 is in place within the forward aperture 92. In this way the eccentric cam assembly 80 is used to adjust the pivot angle α and, in turn, the caster angle of the front wheel associated with the particular radius arm. The adjustment means associated with the radius arm 22 is preferably identical to the adjustment means described above with respect to the radius arm 12.

Once a select pivot angle is obtained through the adjustment means, a connection means associated with each radius arm secures together the two portions of the radius arm. The connection means thereby maintains the select caster angle. Referring now to the radius arm embodiment shown in FIGS. 1–7, the connection means for the radius arm 12 preferably includes the forward bolt 94 that passes commonly through washers 89 and 91, forward aperture 92 in forward portion 66, and apertures 96 and 98 in rearward portion 70. The forward bolt 94 is secured in place by nut 102. The connection means shown in the figures also includes a cam bolt 104 that passes commonly through the cam assembly 80, apertures 87 and 88 in rearward portion 70, the elliptical slot 90, and a washer 85 disposed in aperture 87 of rearward portion 70. The cam bolt 104 is secured by nut 106. The connection means associated with the radius arm 22 is preferably identical to the connection means described above with respect to the radius arm 12.

Alternative radius arm system embodiments are shown for example in FIGS. 8–11. The embodiment shown in FIGS. 8 and 9 includes a one-piece radius arm 108 which has a forward end 110 and a rearward end 112. Again, an adjustment means permits quick, easy and accurate adjustment of the vehicle front wheel caster angle. In particular, the adjustment means permits adjustment of the vertical position of the rearward end 112 of the radius arm 108 relative to the vehicle frame 16. A change in the vertical position of the rearward end 112 of the radius arm 108 relative to the vehicle frame 16 in turn changes the front wheel caster angle at the forward end 110 of the radius arm.

The adjustment means shown in FIGS. 8 and 9 includes the vehicle frame bracket 114 and cams 116 and 118. Bracket 114 includes apertures 107, 109 and 111 through which bolts and rivets pass to attach the bracket 114 to the vehicle frame 16. Cams 116 and 118 have apertures 121 and 123, respectively. Cams 116 and 118 are received within recesses 128 and 132 on the respective sides of bracket 114. Apertures 130 and 105 within the respective recesses 128 and 132 permit passage of a retaining bolt 125 for all orientations of the positioned cams 116 and 118.

The retaining bolt 125 passes commonly through aligned apertures 116 and 118, and through an inner sleeve of a radius arm silent block bushing that is positioned in the rearward end 112 of the radius arm 108. The cams 116 and 118 are rotated together to vary the vertical position of the retaining bolt, which in turn changes the vertical position of the rearward end 112 of the radius arm 108 relative to the vehicle frame 16. Rotation of the cams thereby changes the front wheel caster angle. The connection means in this embodiment preferably includes the retaining bolt 125 and nut 127 combination.

Another alternative embodiment of the adjustment means is shown for example in FIGS. 10 and 11. This embodiment includes vehicle frame bracket 120, which has apertures 113, 115 and 117 through which bolts and rivets pass to attach the bracket 120 to the vehicle frame 16. The adjustment means of this embodiment includes assorted plate pairs, the individual plates of which are received within recesses 127 and 129 on the respective sides of bracket 120. Apertures 119 and 131 within the respective recesses 127 and 129 permit passage of the retaining bolt 125.

Three example plate pairs, 122, 124 and 126, are shown in FIG. 11. Plate pairs 122, 124 and 126 have apertures 133–138 in the respective plates for passage of the retaining bolt 125. All of the plates of plate pairs 122, 124 and 126 are similarly shaped to permit interchangeability among the plate pairs. Each pair of apertures 133 and 134, 135 and 136, and 137 and 138 in the respective plate pairs align with each other when the plate pair is positioned within the recesses 127 and 129 of bracket 120.

A select vertical position of the rearward end 112 of the radius arm 108 relative to said vehicle frame 16 is obtained in this embodiment through the selection and placement of a particular plate pair. The individual plates of the selected plate pair are inserted into the respective recesses 127 and 129 in vehicle frame bracket 120. The plates are positioned such that the apertures 135 and 136 horizontally align with one another and with an inner sleeve of a radius arm silent block bushing that is positioned in the rearward end 112 of the radius arm 108.

The retaining bolt 125 passes commonly through the aligned apertures of the plate pair and through the radius arm bushing. The vertical position of the aligned apertures in the installed plate pair determines the vertical position of the retaining bolt 125 relative to the vehicle frame 16. In this way the particular selection and placement of a plate pair in the bracket 120 determines the vertical position of the rearward end 112 of the radius arm 108 relative to the vehicle frame 16 and, in turn, determines the front wheel caster angle. The connection means in this embodiment preferably includes the retaining bolt 125 and nut 127 combination.

Figure 2:
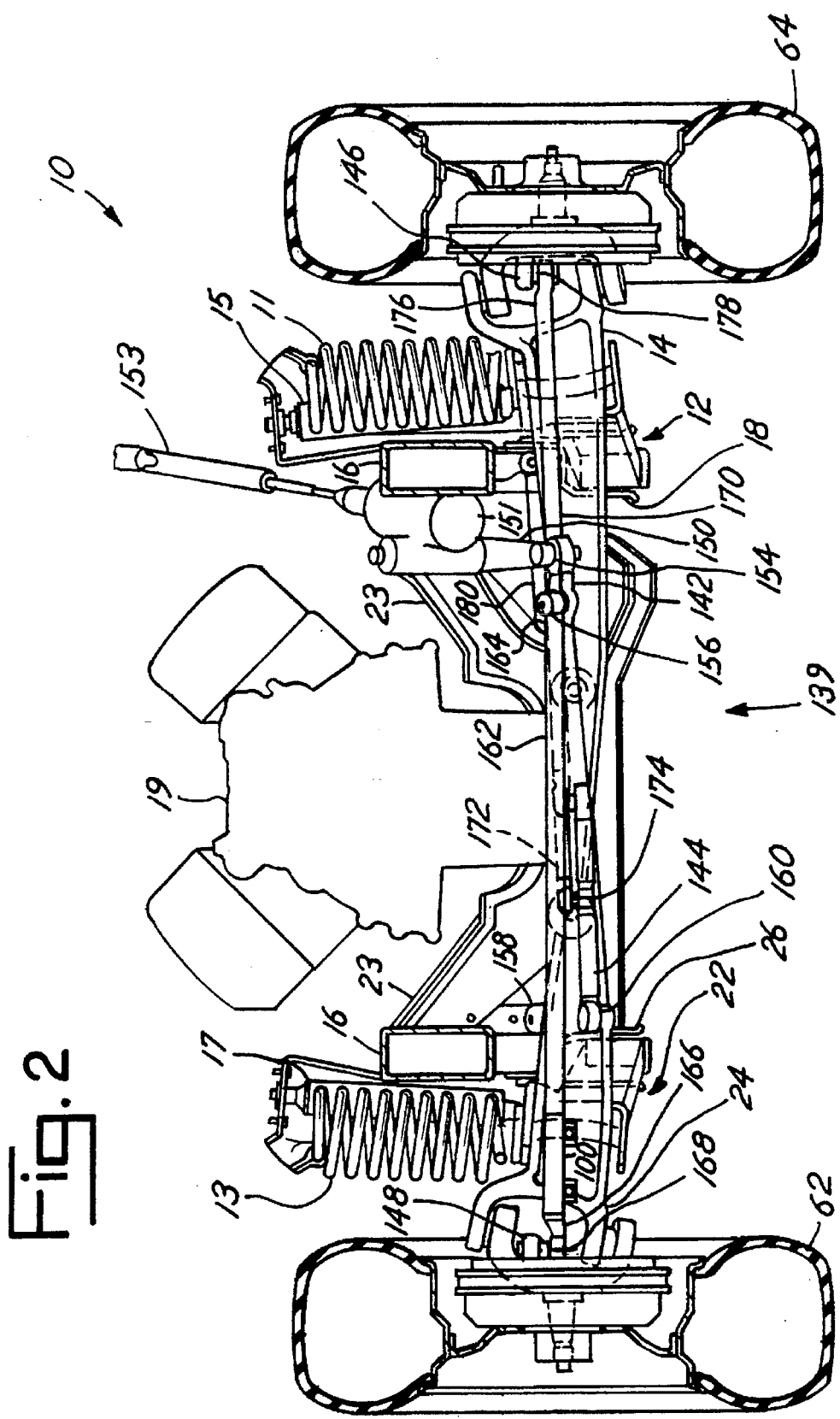
FIG. 2 is a front elevational view of the front suspension system illustrated in FIG. 1.

Referring now to FIGS. 1–3, the front suspension system includes a parallelogram steering linkage assembly 139. A center link 140 has an end 142 and an end 144. The end 142 of the center link 140 lies adjacent a steering knuckle 146 or, in other words, lies closer to the steering knuckle 146 than it does the steering knuckle 148 on the other side of the vehicle frame 16. The end 144 of the center link 140 lies adjacent the steering knuckle 148 or, in other words, lies closer to the steering knuckle 148 than it does the steering knuckle 146. A pitman arm 150 connects to the end 142 of the center link 140 through ball socket 154. The pitman arm 150 is, in turn, linked to the steering gear 151 and steering column 153. An idler arm 158, which is connected to cross member 23, attaches to the end 144 of the center link 140 through a bushing 160 that works as a revolute joint, whereby movement is limited to rotation about a single axis.

A tie rod 162 has an end 164 that is connected to the end 142 of the center link 140 through ball socket 156. The other end 166 of the tie rod 162 is connected to the steering knuckle 148 through ball joint 168. A tie rod 170 has an end 172 that is connected to the center link 140 through a ball socket 174 at a point intermediate the end 142 and the end 144 of the center link 140. The other end 176 of the tie rod 170 is connected to the steering knuckle 146 through ball joint 178. An optional steering damper 180 preferably is connected in a conventional manner between the vehicle frame 16 and the center link 140 for heavy-duty applications.

The particular points of attachment of the tie rod ends 164 and 172 to the center link 140 is determined through computer optimization. The suspension designer selects the locations of the tie rod ends in 3-dimensional space in order to achieve the desired toe curve, percent Ackerman, and package. Once the x, y, and z coordinates are determined, the lengths of the tie rods can be calculated. Sleeves similar to sleeve 100 may be used to permit adjustment of the tie rod lengths.

The parallelogram steering linkage assembly of the present invention significantly improves the steering and handling of the vehicle. In traditional Haltenberger-style steering designs used on other twin I-beam suspension systems, for example, the two front tires typically toe different magnitudes, rather than symmetrically as desired, when the one tire jounces and the other tire is fixed in the vertical direction. This and other issues are solved by the steering linkage assembly of the present invention. Since, for example, the assembly decouples left and right sides of the suspension system, the toe curves associated with each front tire are no longer dependent on the instantaneous vertical displacement of the other front tire. The steering linkage assembly thereby helps reduce tire wear, steering gear loads, and vehicle drift and wander in straight-line driving.

Although certain embodiments of the invention have been described and illustrated herein, it will be readily apparent to those of ordinary skill in the art that a number of modifications and substitutions can be made to the twin 1-beam front suspension system disclosed and described herein without departing from the true spirit and scope of the invention.

We claim:

1. A twin I-beam front suspension system, comprising:
   a first radius arm having a forward end and a rearward end, said forward end adapted to be connected to a first front axle;
   a first bushing connected intermediate said rearward end of said first radius arm and a vehicle frame, said first bushing having a first static rate;
   a second radius arm having a forward end and a rearward end, said forward end adapted to be connected to a second front axle disposed rearward of said first front axle; and
   a second bushing connected intermediate said rearward end of said second radius arm and said vehicle frame, said second bushing having a second static rate different than said first static rate.

2. The twin I-beam front suspension system as set forth in claim 1, wherein said first and second bushings are both silent block bushings.

3. A twin I-beam front suspension system as set forth in claim 2, wherein said first and second silent block bushings are elliptical in shape.

4. A twin I-beam front suspension system as set forth in claim 1, wherein said first and second bushings have corresponding dimensions, and wherein at least one dimension of said first bushing is smaller than a corresponding dimension of said second bushing.

5. A twin I-beam front suspension system as set forth in claim 1, wherein said first and second bushings have corresponding dimensions, and wherein at least one dimension of said first bushing is larger than a corresponding dimension of said second bushing.

6. A twin I-beam front suspension system as set forth in claim 1, further comprising:
   a center link having a first end adjacent a first steering knuckle and a second end adjacent a second steering knuckle;
   a first tie rod having a first end connected to said first end of said center link and a second end connected to said second steering knuckle; and
   a second tie rod having a first end connected to said center link intermediate said first and second ends of said center link, and a second end of said second tie rod connected to said first steering knuckle.

7. A twin I-beam front suspension system as set forth in claim 6, wherein said first end of said center link is connected to a pitman arm.

8. A twin I-beam front suspension system as set forth in claim 7, wherein said second end of said center link is connected to an idler arm.

9. A twin I-beam front suspension system as set forth in claim 1, wherein said first and second radius arms each have a first portion and a second portion, said first portions being adapted to be connected to a vehicle frame, said second portions each being adapted to be connected to a respective front twin I-beam axle, and wherein said first and second radius arms each have an adjustment means for adjusting a pivot angle between said first portion and said second portion to a select pivot angle and a connection means for securing together said second portion and said first portion at said select pivot angle.

10. A twin I-beam front suspension system as set forth in claim 9, wherein said adjustment means includes at least one cam.

11. A twin I-beam front suspension system as set forth in claim 1, further comprising an adjustment means associated with each of said first and second radius arms for adjusting said rearward end of each said radius arm to a select vertical position relative to said vehicle frame, and a connection means associated with each of said first and second radius arms for securing said rearward end of each said radius arm to said vehicle frame at said select vertical position.

12. A twin I-beam front suspension system as set forth in claim 11, wherein said first and second radius arms are each adapted to be received between two opposing sides of a vehicle frame bracket, and wherein said adjustment means associated with each radius arm includes at least one cam passing through at least one of said sides of said vehicle frame bracket.

13. A twin I-beam front suspension system as set forth in claim 11, wherein said first and second radius arms are each adapted to be received between two opposing sides of a vehicle frame bracket, and wherein said adjustment means associated with each radius arm includes a plate adapted to be received in an aperture in one of said two opposing sides of said vehicle frame bracket, said plate having at least one aperture therein to receive a bushing bolt.

14. A twin I-beam front suspension system as set forth in claim 1, wherein said second static rate is greater than said first static rate.

15. A twin I-beam front suspension system comprising:
   a first vehicle frame bracket;
   a second vehicle frame bracket;
   a first radius arm having a forward end and a rearward end, said forward end adapted to be connected to a first front axle;
   first connection means for securing together said rearward end of said first radius arm and said first vehicle frame bracket;
   a first bushing intermediate said rearward end of said first radius arm and said first vehicle frame bracket, said first bushing having a first static rate;
   adjustment means cooperating with said first connection means for adjusting a vertical position of said rearward end of said first radius arm relative to said first vehicle frame bracket, whereby said rearward end of said first radius arm can be fixed by said first connection means at a select vertical position;
   a second radius arm having a forward end and a rearward end, said forward end adapted to be connected to a second front axle disposed rearward of said first front axle;
   connection means for securing together said rearward end of said second radius arm and said second vehicle frame bracket;
   a second bushing intermediate said rearward end of said second radius arm and said second vehicle frame bracket, said second bushing having a second static rate which is greater than said first static rate of said first bushing;
   adjustment means cooperating with said second connection means for adjusting a vertical position of said rearward end of said second radius arm relative to said second vehicle frame bracket, whereby said rearward end of said second radius arm can be fixed by said second connection means at a select vertical position;
   a center link having a first end adjacent a first steering knuckle and a second end adjacent a second steering knuckle;
   a first tie rod having a first end connected to said first end of said center link and a second end connected to said second steering knuckle; and
   a second tie rod having a first end connected to said center link intermediate said first and second ends of said center link, and a second end of said second tie rod connected to said first steering knuckle.

16. A twin I-beam front suspension system, comprising:
   a first radius arm having a forward end and a rearward end, said forward end of said first radius arm adapted for connection to a first front axle, and said rearward end of said first radius arm adapted to be received between two opposing sides of a first vehicle frame bracket;
   a first bushing connected intermediate said rearward end of said first radius arm and a vehicle frame;
   a second radius arm having a forward end and a rearward end, said forward end of said second radius arm adapted for connection to a second front axle disposed rearward of said first front axle, and said rearward end of said second radius arm adapted to be received between two opposing sides of a second vehicle frame bracket;
   a second bushing connected intermediate said rearward end of said second radius arm and said vehicle frame;
   an adjustment means associated with each of said first and second radius arms for adjusting said rearward end of each said radius arm to a select vertical position relative to said vehicle frame, said adjustment means including at least one cam passing through at least one of said sides of each said vehicle frame bracket; and
   a connection means associated with each of said first and second radius arms for securing said rearward end of each said radius arm to said vehicle frame at said select vertical position.

17. A twin I-beam front suspension system as set forth in claim 16, wherein said first bushing has a first static rate and said second bushing/has a second static rate.

18. A twin I-beam front suspension system as set forth in claim 17, wherein said first and second bushings are both silent block bushings that are elliptical in shape.

* * * * *